United States Patent

[11] 3,590,528

| [72] | Inventor | Thomas H. Shepherd<br>Hopewell, N.J. |
|---|---|---|
| [21] | Appl. No. | 861,155 |
| [22] | Filed | Sept. 25, 1969 |
| [45] | Patented | July 6, 1971 |
| [73] | Assignee | Princeton Chemical Research Inc.<br>Princeton, N.J.<br>Continuation-in-part of application Ser. No. 777,921, Nov. 21, 1968, now abandoned, which is a continuation of application Ser. No. 592,981, Nov. 9, 1966, now abandoned. |

[54] DECOMPOSABLE POLYBUTENE-1 AGRICULTURAL MULCH FILM
1 Claim, No Drawings

[52] U.S. Cl.................................................. 47/9,
260/45.85, 260/45.95, 260/93.7

[51] Int. Cl........................................................ C08f 3/02,
C08f 45/58
[50] Field of Search............................................. 47/9;
260/93.7, 45.85, 45.95

[56] References Cited
UNITED STATES PATENTS

| 3,252,250 | 5/1966 | Lemaire ....................... | 47/9 |
| 3,274,731 | 9/1966 | Vigneault et al............. | 47/9 |
| 3,299,568 | 1/1967 | Tobolsky et al. ............. | 47/9 |
| 3,341,357 | 9/1967 | Feild ........................... | 47/9 X |
| 3,454,510 | 7/1969 | Newland et al. ............. | 47/9 X |

Primary Examiner—Robert E. Bagwill
Attorney—Burgess, Dinklage & Sprung

ABSTRACT: Polybutene-1 film for use as an agricultural mulch. This film degrades and substantially disintegrates of its own volition within a growing season.

DECOMPOSABLE POLYBUTENE-1 AGRICULTURAL MULCH FILM

RELATED APPLICATION

This application is a continuation-in-part of Ser. No. 777,921, "Agricultural Mulsh," filed Nov. 21, 1968 which in turn was a streamlined continuation of Ser. No. 592,981, filed Nov. 9, 1966 both abandoned.

This invention relates to mulch for use in connection with agricultural endeavors. It more particularly refers to such use of particular organic polymers.

Agricultural mulches are in general well known. These materials are used to cover the soil about crops or other plantings in order to prevent or retard weed growth and to increase soil water retention and temperature. Thus, it is possible to plant earlier and prevent frost damage. Various naturally occuring materials have been used for this purpose for many years such as peat, peat moss, wood chips, chopped bark, sawdust, etc.

In recent years, it has been discovered that some synthetic polymeric materials, e.g., polyethylene, have utility as mulches. Polyethylene film has been thus used both in its translucent or transparent state, or in its opaque state, i.e., filled with an opaque filler such as carbon black. Polyethylene was originally considered admirably suited to this use because it withstood weathering very well and thus could be reused year after year. In this respect, the polyethylene mulch could be and was picked up off the ground at the end of the growing season and relayed after plowing at the beginning of the next season. By thus reusing the mulch for more than one growing season, it was thought that economic advantage was thus given to the farmer sufficient to induce him to purchase the polyethylene mulch, which probably carries a somewhat higher price than the various natural mulches.

It has been found, however, that at least for certain circumstances and with certain crops, it is not economically desirable to pick up the mulch at the end of the growing season and relay it the next year. Rather, it would be more desirable not to have to pick up the mulch, thus more closely conforming to the practice with natural mulches. These natural mulches are not picked up but rather are turned back into the soil upon plowing at the start of the next growing season.

Further, it has been discovered that certain desirable materials can be incorporated into the polymeric mulch which are then leached out during the growing season at some rate depending upon weather and particularly rainfall conditions. These materials include fertilizers, soil conditioners, such as alkaline agents for example herbicides, insecticides, etc. It is possible that under certain weather conditions not all of these materials will be leached out of the polymeric mulch during the growing season, and that therefore that which remains in the mulch is lost to the soil until the next growing season, when the mulch is relayed. However, some of these materials which remain in the mulch will be lost during winter storage. Further, if all of these materials are used either in one growing season or over other periods of time, when the mulch is reapplied, these same materials will have to be readded to the soil through a vehicle other than the mulch since reincorporation of them into the mulch would be extremely inconvenient and expensive.

It is therefore an object of this invention to provide a novel synthetic agricultural mulch.

It is another object of this invention to provide as a novel agricultural mulch a synthetic organic polymer which need not be taken up and reused after a growing season.

It is a further object of this invention to provide a synthetic agricultural mulch which has incorporated therein soil conditioners, additives, etc.

Other and additional objects will become apparent from a consideration of this entire specification, including the claims appended hereto.

In accord with and fulfilling these objects, one aspect of this invention includes the use of butene-1 polymers and copolymers as an agricultural mulch. Butene-1 polymers have the very desirable characteristic of being decomposable when subjected to weathering over a period of time. Further, they have the capability of decomposing over a period of time when contacted with soil, so that it is possible and practical to leave these polymeric mulches on the ground at the end of the growing season and merely plow under any mulch which remains at the start of the next growing season. These mulches may have incorporated therein one or more of the many materials conventionally incorporated in mulches, in the amounts and for the purposes conventionally employed. Thus, for example, there may be incorporated therein fertilizers, herbicides, insecticides, soil conditioners, opacifying agents, antioxidants or oxidation intensifiers, ultraviolet stabilizers, etc. These materials may comprise up to about 75 weight percent of the total mulch. Exemplary of these added materials are carbon black, urea, calcium phosphate, magnesium phosphate, potassium phosphate, potassium nitrate, ammonium nitrate, potassium chloride, etc. It has been found desirable to provide up to about 40 weight percent fertilizer in the mulch.

Particular advantage has been realized through the use of the mulch of this invention with such high value crops as strawberries, pineapples and tomatoes.

The mulch according to this invention may be in substantially continuous film form, with the crop in question having been planted through the film at selected intervals. This mulch may also be in shredded, particulate or strip form as the case may be, and laid down in much the same manner as naturally occurring mulches. It has been found that sunlight particularly induces the decomposition of butene-1 and so in any of these forms the mulch will substantially decompose over a growing season, or whatever is left can be plowed back into the ground where decomposition of the exposed portions will continue. In this manner none of the material added to the butene-1 polymer is lost and all of it finds its way into the soil. Further the mulch need not be picked up at the end of the season, thereby eliminating a troublesome, expensive and time-consuming operation. By varying the amount and nature of the known ultraviolet stabilizer employed, it is practical to gauge the decomposition rate and thus the total decomposition time for any given mulch.

Where the mulch of this invention is in film form, it has been found suitable to provide a film thickness of up to about 2 mils. While the film thickness is by no means critical, it is preferred to employ films of at least about 1 mil thickness. Similarly dimensioned strips, shreds, or coarse particles can be used.

The polymer according to this invention may be a homopolymer of butene-1 or it may be a co- or high polymer of predominantly butene-1 with other copolymerizable olefinically unsaturated monomers, such as ethylene, propylene, butadine, isoprene, etc. or with more than one of these. Further, mixtures of butene-1 homopolymer and homo- or copolymers of other monomers are suitable. Still further, graft or block copolymers may be used. Ethylene-propylene rubber and poly cisbutadiene have been found to be particularly effective.

The polymer may have a molecular weight of about 10,000 to 2,000,000; preferably about 40,000 to 1,500,000.

EXAMPLE 1

A polybutene-1 resin (100 parts) of $1\times10^6$ molecular weight is admixed on a rubber mill with potassium chloride (7 parts) calcium phosphate (7 parts) and urea (23 parts). The mixture is milled at 260° F. and is sheeted out to give a film 1.5 mils thickness.

EXAMPLE 2

Polybutene (100 parts) is ground in a Banbury mixer at 300° F. with a mixture of urea (20 parts), ammonium nitrate (20 parts), calcium phosphate (12 parts) and potassium chloride (10 parts). The mixture is sheeted out in the form of a film 0.1 mil in thickness. A portion of this is ground to a coarse powder and another portion is chopped into strips 0.5 cms. wide and 1.0 cm. long.

EXAMPLE 3

The film materials obtained from examples 1 and 2, when applied over moist earth, with seedlings planted therethrough, gave the same favorable moisture and weed control results as polyethylene, but in addition underwent degradation with concomittant leaching of the fertilizer materials into the soil, with pulverization of the film taking place near the end of the growing season.

EXAMPLE 4

A commercial polybutene homopolymer (made by the Petro-Tex Corp.) was tested with various levels of antioxidant and ultraviolet light stabilizers in the form of 3—4 inch wide film exposed to early fall sunlight and weather in the Princeton, N.J. area to determine the effect of the stabilizers on the life of the film. Test No. 2 was of a film having a level of stabilizers usual for a commercial grade film. The results were as follows:

| Test No. | Stabilizer weight percent | | | | Degradation period of film, days | |
|---|---|---|---|---|---|---|
| | A | B | C | D | 1 mil | 2 mils |
| 1 | 0 | 0 | 0 | 0 | 13 | 13 |
| 2 | 0.2 | | 0.2 | 0 | 35 | 35 |
| 3 | 0.02 | 0 | 0.2 | | 27 | 27 |
| 4 | 0.22 | 0 | 0.4 | | 29 | 41 |
| 5 | 0.02 | 0 | 0.8 | | 28 | 45 |
| 6 | 0.02 | 0.3 | 0.2 | 0.4 | 29 | 83 |
| 7 | 0.02 | 0.2 | 0.2 | | 54 | 54 |
| 8 | 0.02 | 0.2 | 0.2 | 0.2 | 54 | >138 |
| 9 | 0.02 | 0.2 | 0.2 | 0.4 | 75 | >138 |

NOTE: A=Tri(nonylated phenyl) phosphite; B=Octadecyl-3,5,-di-tert.-butyl-4-hydroxy hydro cinnamate, C=Dilauryl thiodipropionate; D=2-(3',5'-di-tert.-butyl-2'-hydroxy phenyl)-5-chlorobenzo triazol.

It can be seen from this table that by proper selection of the stabilizer level, a predetermined life can be imparted to the film.

I claim:

1. An agricultural mulch decomposable when subjected to weathering during a growing season consisting of a continuous film at least 1 mil thick of butene-1 homopolymer having a molecular weight in the range of 10,000 to 2,000,000 and containing in the range of 0.02 to 0.8 weight percent of an antioxidant selected from the group consisting of tri (nonylated phenyl) phosphite and dilauryl thiodipropionate, and in the range of 0 to 0.4 weight percent of an ultraviolet light absorber selected from the group consisting of octadecyl-3,5-di-tert.-butyl-4-hydroxy hydro cinnamate and 2-(3', 5'-di-tert.-butyl-2'-hydroxy phenyl)-5-chloro-benzo triazol said antioxidant and ultraviolet light absorber serving to extend the normal decomposition time of said film to a desired predetermined time.